Patented Mar. 3, 1953

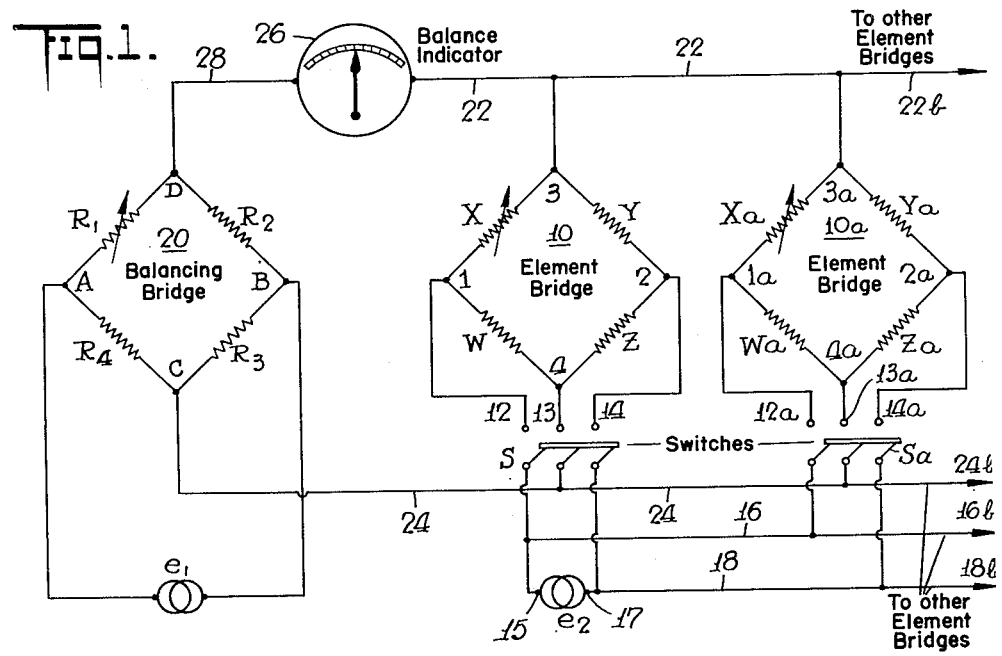
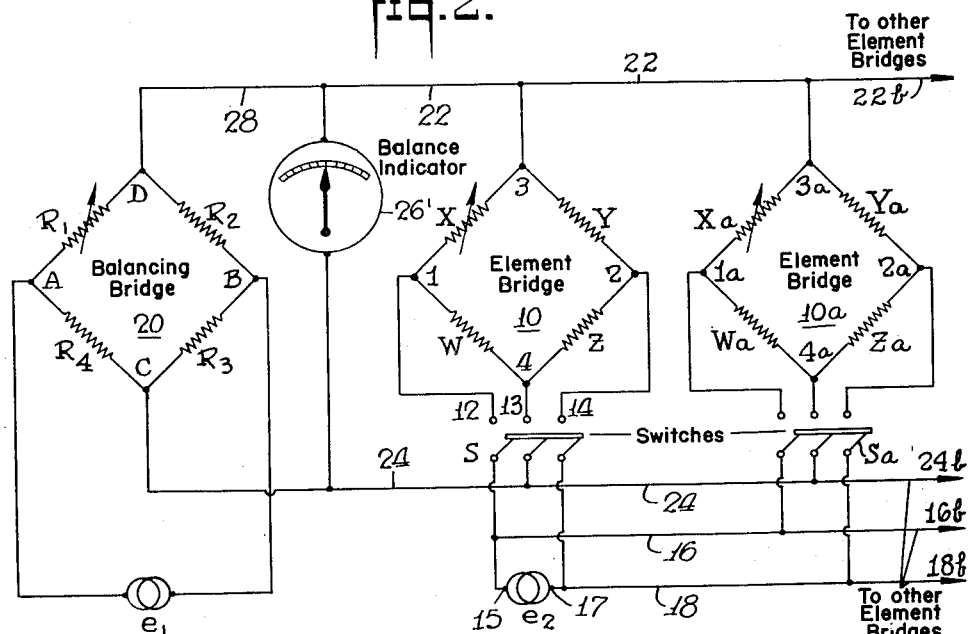

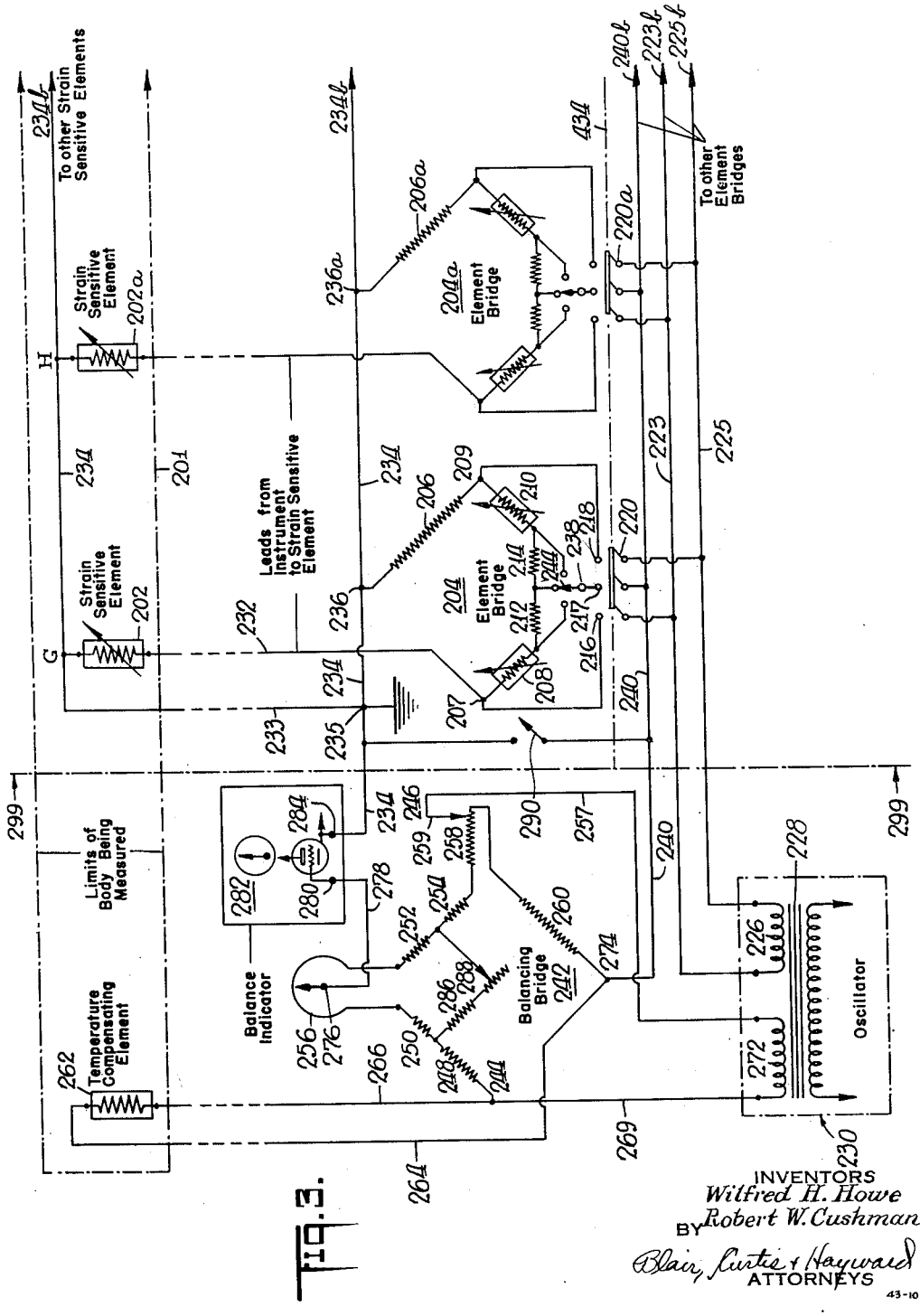

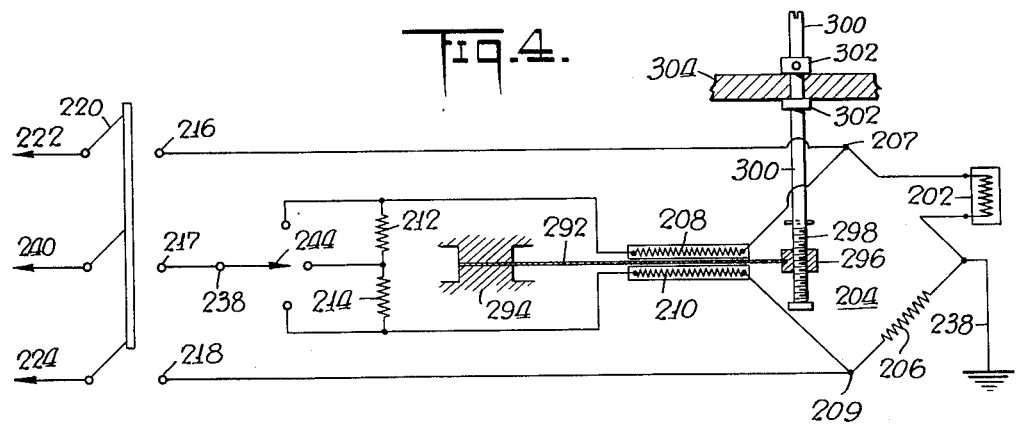
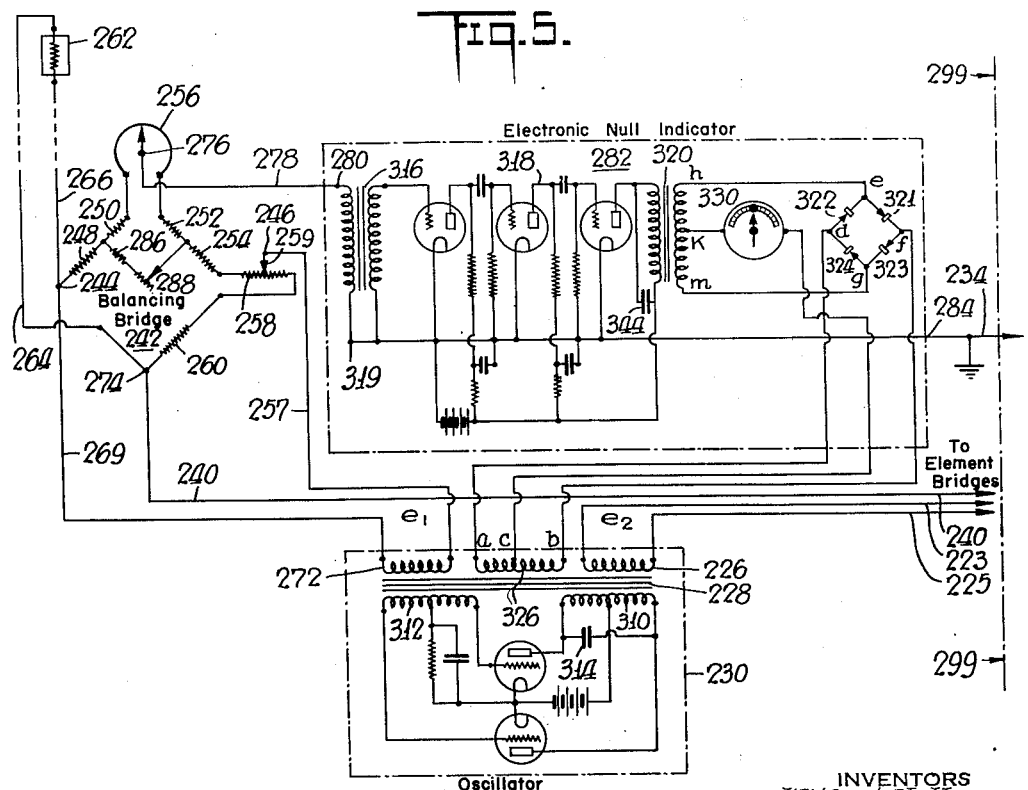

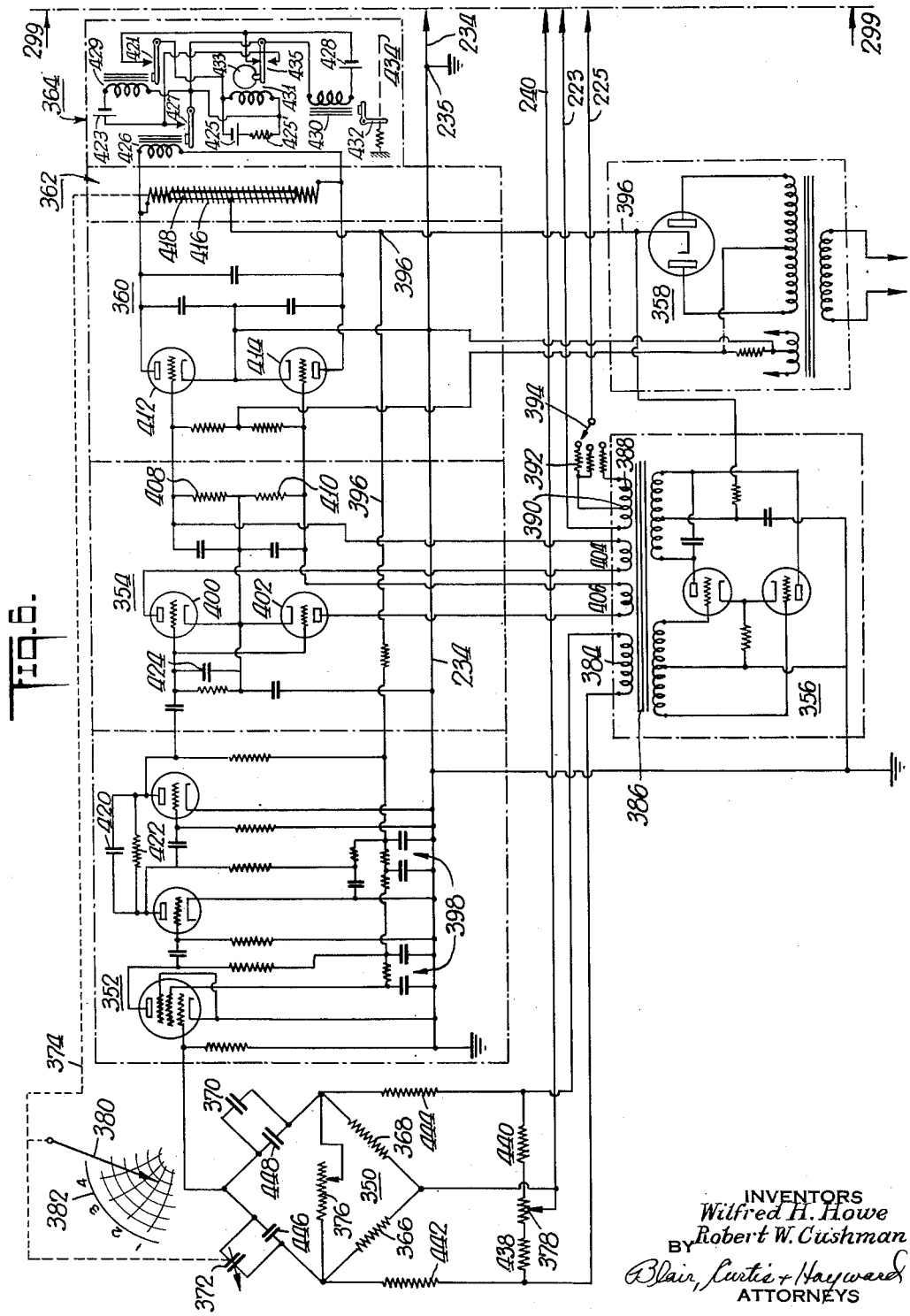

2,630,007

UNITED STATES PATENT OFFICE 2,630,007

ELECTRICAL MEASURING APPARATUS, INCLUDING A CONDITION RESPONSIVE IMPEDANCE

Wilfred H. Howe and Robert W. Cushman, Sharon, Mass., assignors to The Foxboro Company, Foxboro, Mass., a corporation of Massachusetts Application July 28, 1943, Serial No. 496,438

21 Claims. (Cl. 73—88.5)

1

This invention relates to apparatus for measuring, indicating, and recording changes in the electrical characteristics of sensitive elements, and more particularly to apparatus for successively measuring the electrical characteristics of a plurality of elements and recording the same.

In industry it is frequently desirable to measure the values of such conditions as temperature, pressure, flow, electrical potential, change of physical dimensions, etc. by measuring the electrical characteristics of condition sensitive elements. It is an object of the present invention to provide improved apparatus for measuring such electrical characteristics.

It is also frequently desirable to utilize a master measuring apparatus to measure the electrical characteristics of a succession of such sensitive elements, and it is another object of the present invention to provide apparatus for facilitating the switching of the master measuring apparatus from one condition sensitive element to another without materially affecting the accuracy of measurement.

It is another object of the present invention to provide such apparatus that, although operated from the usually available power supplies, are not susceptible to thermo-electric effects nor to pick-up from commercial A. C. power lines or other similar sources of stray electric fields.

Other objects will be in part obvious and in part pointed out hereinafter.

In the drawings:

Figure 1 shows diagrammatically an electrical measuring system embodying the invention, and in which means is provided for measuring in succession the electrical characteristics of a plurality of condition sensitive elements by means of a plurality of element bridges and a balancing bridge;

Figure 2 is somewhat similar to Figure 1, but shows another embodiment of the invention;

Figure 3 shows in greater detail the system of Figure 1, but specifically applied to the measurement of the electrical characteristics of a succession of mechanical strain sensitive elements connected in the element bridges;

Figure 4 is a detailed view diagrammatically showing mechanism for adjusting the setting of element bridges shown in Figure 3;

Figure 5 is a more detailed view showing the circuit diagram of one embodiment of an indicating apparatus suitable for use in the system shown in Figure 3;

Figure 6 is a detailed view showing schematically part of the structure and the circuit diagram of one embodiment of a self-balancing recording apparatus suitable for use in the system shown in Figure 3.

Referring now to Figure 1, there are shown two of a plurality of electrical bridges generally indicated at 10 and 10a which will hereinafter be called "element bridges," both of which are substantially identical both electrically and physically. Each of these bridges has the usual arrangement of four interconnected arms composed of four approximately equal impedances W, X, Y and Z. Considering bridge 10, the two opposite corners 1 and 2 are connected through two contacts 12 and 14 of a suitable triple-pole single-throw switch S to the terminals 15 and 17 of a suitable electrical power supply $e_2$. The other two corners 3 and 4 of the bridge are connected, respectively, through a conductor 22, and through the third contact 13 of switch S and a conductor 24 to a "balancing bridge" generally indicated at 20, and a balance indicator 26. Similarly, element bridge 10a, formed of resistors $Wa$, $Xa$, $Ya$, and $Za$ is connected through a suitable switch $Sa$ to the power source $e_2$, and the two conductors 22 and 24. Any number of additional element bridges may be connected in a similar manner to the circuit through the wires 16, 18, 22 and 24 as indicated by the arrows 16b, 18b, 24b and 22b, so that they may be successively connected to the balancing bridge 20 and the indicator 26. In these element bridges, the impedances X, Xa, etc. are variable elements whose electrical characteristics vary with the variation of some condition such as temperature, pressure, mechanical strain, etc.

In the embodiment of the invention shown in Figure 1, the balancing bridge 20 comprises a standard bridge circuit formed of four arms of approximately equal impedance $R_1$, $R_2$, $R_3$ and $R_4$ interconnected as shown. Two opposite corners A and B of the bridge are connected across a suitable source of electrical potential $e_1$. The other two opposite corners C and D of the bridge are connected, respectively to the conductor 24 and through a conductor 28, to the balance indicator 26.

In the balancing bridge 20, impedance $R_1$ is a manually variable impedance which may be adjusted to vary the balance condition of this bridge. Balance indicator 26 is a sensitive ammeter, galvanometer, electrometer, or other device capable of indicating a condition of zero current flow or of zero voltage.

With the circuit just described, any unbalanced voltage developed across element bridge 10 between terminals 3 and 4 is impressed in series with any unbalanced voltage developed between terminals C and D of balancing bridge 20 across balancing indicator 26. Thus when switch S is closed to connect element bridge 10 to balancing bridge 20, assuming that both bridges are approximately in balanced condition, if element bridge 10 is unbalanced by some variation of the condition being measured which causes a change in the impedance of X, the unbalanced voltage of element bridge 10, developed between terminals 3 and 4, produces an unbalance in the circuit formed by conductor 24, bridge 20, conductor 28, balance indicator 26, and conductor 22, which causes a deflection of balance indicator 26.

If balancing impedance $R_1$ of balancing bridge 20 is adjusted to produce an unbalance of this bridge 20 equal and opposite to the unbalance produced in element bridge 10 by change of the impedance of X, bridge 20 will produce a voltage across conductors 24 and 28, which is equal to the voltage produced across conductors 24 and 22 by the unbalance of element bridge 10. Hence this will reduce the deflection of balance indicator 26 to zero, serving to indicate that the two bridges are balanced against each other. Inasmuch as impedance $R_1$ is adjustable, it may be calibrated in units of the variable condition to which the impedance X is sensitive, and thus its setting serves as a measure of the value of this condition.

By opening switch S and closing switch $S_a$, element bridge 10 is disconnected from, and element bridge 10a connected to the balancing apparatus comprising balancing bridge 20, and balance indicator 26. When this is done the value of the condition to which the impedance of element $X_a$ is sensitive may then be measured by adjusting balancing bridge impedance $R_1$ until balance indicator 26 shows the bridges to be in balance.

The balancing and measuring arrangement just described is particularly advantageous when used to measure in succession the values of a plurality of condition sensitive elements by successively connecting them to a single master measuring instrument. Such successive changing of connections involves the use of some form of switching mechanism which inherently introduces non-uniform and variable contact resistance effects into the circuits. With the known circuits such variable contact resistance would be algebraically added to the impedance of the sensitive element and thus would affect the accuracy of the successively measured values to the full extent of the variable switch contact resistance.

In the present balancing bridge system, which will hereinafter be referred to as the "double bridge" system, the effect of normal variation in the contact resistance of the switches is reduced to such a small percentage of the measured value that it may always be maintained within the permissible accuracy of the system. This is particularly advantageous where, as in the embodiment of the invention shown in Figure 3, the variation of the impedance of the condition measuring element X is extremely small, usually much less than is the normal variation of the switch contact resistance.

That the above described double bridge system for measuring the value of a condition by measuring the unbalance of a balancing bridge, substantially eliminates switch contact effects is evident from a consideration of its operation. If switch S is open the balancing bridge 20 can be balanced by manipulation of adjustable resistance $R_1$ so that there is no voltage across the points C and D. Now, if switch S is closed, the element bridge 10 can be adjusted by selecting proper values for the arms W, Y and Z so that there is no voltage across the points 3 and 4. Under this condition of element bridge balance, there is no current flowing between the points C and 4, and between D and 3. Hence the bridge balance is independent of any resistance in the circuit from C through conductor 24 and switch contact 13 to 4. This is true also for any condition of balance in the entire bridge system formed of balancing bridge 20 and element bridge 10, when there is zero potential between points D and 3, and between C and 4, under which condition the bridge system balance is independent of resistance in circuit C, 4.

At the time of bridge balance in any bridge circuit, the balance of the bridge is independent of the current circulating in the bridge arms, and hence is independent of the voltage impressed on the bridge. Thus, the bridge balance of element bridge 10 is independent of the resistance of the switch contacts 12 and 14 of switch S connecting the potential source $e_2$ to this bridge. Therefore, it is evident that when the balancing bridge is in balance, and when the element bridge containing the arm whose value is to be measured is in balance, the entire double bridge system is in balance and a condition is obtained in which the resistance of the switch S connecting the balancing bridge to the condition sensitive bridge whose value is to be measured, does not affect the accuracy of measurement.

Under the condition when the element bridge 10 is not in balance and there is a potential difference between corners 3 and 4, which potential is balanced by a potential difference established across corners C and D of the balancing bridge 20 by manipulating the adjustable impedance $R_1$ so that the indicator 26 indicates a null or balanced condition for the double bridge system as a whole, there is no potential difference between C and 4. Thus the resistance in the circuit formed by conductor 24 and switch contact 13 between C and 4 does not affect the relationship by which a given change in the value of the condition sensitive element is balanced by manipulating adjustable impedance $R_1$ to provide a null condition in the double bridge system as shown by zero indication of indicator 26. However, when element bridge 10 is unbalanced and there is a potential difference between points 3 and 4, then the value of current circulating in the bridge arm does affect the potential difference between 3 and 4, and the magnitude of the potential applied to the element bridge 10 across terminals 1 and 2 from the source $e_2$ affects the magnitude of the potential between corners 3 and 4 of element bridge 10. Under this condition the resistance of contacts 12 and 14 of switch S influences the magnitude of this potential applied to the element bridge 10 between terminals 1 and 2 in the ratio of the absolute magnitudes of the switch contact resistances to the total element bridge resistance. Thus, if the switch contact resistance changes by a value equal to 1% of the total resistances of the circuit connected to the potential source $e_2$, i. e., the resistance between corners 1 and 2 of element bridge 10, then the bridge unbalance potential between corners 3 and 4 is affected by 1% causing a maximum error of 1% in the measurement of the electrical characteristic of the condition sensitive element.

If it is assumed that the arrangement just described is used to measure mechanical strain by measuring change in resistance of a strain sensitive element, and representative values are assigned to the various elements of the circuit, advantages of this double bridge arrangement are readily apparent. When set up to measure mechanical strain, resistances W, X, Y and Z may be given a value of 120 ohms each, a value which has been found satisfactory in actual operation. A commercial strain sensitive resistance element X, such as might be used in this circuit, may have a normal resistance of 120 ohms. Under stress it may change its resistance by not more than about $5/100$ to $1/10$ of an ohm. Typical rapidly operating commercial switch contacts may, however, be expected to change in resistance as much as ½ an ohm from one switch closure to the next. It can readily be seen that if a usual single bridge measuring circuit were used, the variations in switch contact resistance would exceed and completely submerge variations in the value of the resistance in the condition sensitive arm of the bridge caused by change in the mechanical strain being measured.

However, with the double bridge circuit just described, the change in the value of resistance X of $1/100$ of an ohm, caused by change in the mechanical strain being measured, can be accurately measured to within less than ½ of 1% even though the resistance of the contacts 12, 13 and 14 of switch S may change as much as ½ an ohm. This follows because a change of 0.6 ohm in the resistance of contacts 12 and 14 would change the voltage between corners 1 and 2 of element bridge 10 by a percent equal to $$\frac{0.6}{120} \times 100\% = \frac{1}{2}\%$$

and therefore the unbalanced voltage between corners 3 and 4 of the element bridge 10, caused by variation of measuring element resistance X, is affected by the same percent. Thus, the setting of the adjustable resistance $R_1$ of balancing bridge 20 is changed by only ½% in order to bring the double bridge system into balance to correct for the 0.6 ohm change in the contact resistance of switch S.

Figure 2 shows another arrangement which may be used to detect a balanced condition in the double bridge system. In this arrangement the balance indicator 26' is connected in parallel with the corners C, D and 3, 4 of bridges 10 and 20, respectively, instead of in the series arrangement shown in Figure 1.

When the apparatus is connected in this manner and both the balancing bridge 20 and the element bridge 10 are in balance, there is no current flowing through indicator 26' and there is no potential drop in the circuit formed by conductor 24 and switch contact 13 connecting C, 4. Hence, the introduction of resistance into the bridge circuit by contact resistance of switch contact 13 will have no effect on the individual balance of the bridges 10 and 20, or of the double bridge system as a whole, likewise, when either bridge is balanced, its balance is independent of the currents in the bridge arms and so is independent of the voltage impressed on the bridge. Thus, when the two bridges 10 and 20 are both in balance, the contact resistances of switch S have no effect on the balance of the double bridge system. Under the condition when the element bridge 10 is unbalanced, a current flows from the source $e_2$ through indicator 26' from terminals 3 and 4. By manipulation of the adjustable resistance $R_1$, a current is caused to flow from terminals C and D of the balancing bridge 20 effectively to provide a counter-current through indicator 26' in opposition to the current from the element bridge 10 flowing therethrough as a result of the unbalance of element bridge 10, so that the double bridge system is restored to balance although the individual bridges 10 and 20 are unbalanced. Although by way of explanation it has been stated that the current flowing through indicator 26' from $e_2$ is balanced by that flowing through the indicator from source $e_1$, and a normal balance is indicated for the double bridge system as a whole, actually the currents flowing in the several bridge arms have been changed from those flowing during bridge balance condition to bring about this new condition of balance. Thus, when the resistance of switch contact 13 in the circuit between points C and 4 has a value approximating zero, there is no detectable potential drop between points C and 4. Thus the change in the balancing bridge required to bring the bridge system as a whole into balance, when the balance of the element bridge 10 is changed by a change in the resistance of the condition sensitive element resistance X, is indicative of the deviation in element bridge 10 from the values which balance it. However, as the value of the resistance of contact 13 increases, the currents flowing in the bridge arms will be altered by the amount necessary to make the potential between points C and D equal to zero and there will be a potential drop between points 3 and 4, and between C and 4. The change in the balancing bridge required to bring the double bridge system to balance will then be in error by an amount proportional to the change in the bridge arm currents produced by a change in the value of the resistance of the switch contact 13. Changes in the contact resistance of contacts 12 and 14 of switch S, in the circuit to potential source $e_2$, causes an error in the measurement of the deviation from the balance condition as above described in connection with Figure 1. Thus, the total effect of contact resistance change in switch S is a percentage error of measurement of the deviation from the values to which the bridges are individually balanced approximately equal to the ratio of the change in contact resistance to the total resistance of the element bridge. As above mentioned, the circuit constants can be chosen such that even abnormally high contact resistance changes are a relatively small part of the circuit resistance, and therefore they will introduce an error into the measurement which is within the permissible limits of error of measurement and therefore may be considered negligible.

Referring now to Figure 3, there is shown, partially diagrammatically, an embodiment of the balancing double bridge circuit described in connection with Figure 1 in which the condition responsive element of each of the element bridges 10, 10a, etc. is a resistance element which will be referred to as a strain gage element. This resistance is so chosen that, when secured to a body, change of dimension of the body to which the element is secured causes change of resistance of the element. Thus, the element bridges are each made responsive to change in mechanical dimensions.

The balancing bridge, together with an amplifier and indicator, may be calibrated in terms of change in dimension, or, indeed, to any other condition, to which the resistance element may be intimately associated and caused to change in resistance with the change of the condition.

A stressed body, represented by dotted line 201, in which the mechanical strain is to be measured at points G, H, etc., has intimately affixed to its surface at these points strain sensitive resistance elements 202, 202a, etc. These elements correspond to the resistances X and Xa described in Figures 1 and 2. As in the embodiment shown in Figure 1, each of these strain sensitive elements 202, 202a, etc. is connected in one arm of resistance-type element bridges 204, 204a, etc. These element bridges correspond to the element bridges 10, 10a, etc. described in connection with Figure 1. Since both of the element bridges shown in Figure 3 are identical, the following description will be directed to the bridge 204 only. In the corresponding bridge 204a, corresponding parts are identified by the numbers used to identify the parts of bridge 204 with the addition of the subscript $a$. It is to be understood that there may be any number of these bridges, all adapted to be sequentially connected to the remainder of the apparatus in the manner generally described in connection with Figure 1.

One arm of element bridge 204, adjacent strain sensitive element 202, is formed of a fixed resistance 206. The two remaining arms of element bridge 204 are formed, respectively of two continuously and oppositely variable resistor elements 208 and 210, and two fixed resistors 212 and 214. The novel structural arrangement used continuously and oppositely to vary resistances 208 and 210 will hereinafter be described in connection with Figure 4. The opposite terminals 207 and 209 of element bridge 204, connected to sensitive element 202 and fixed resistance 206 respectively, are connected through two contacts 216 and 218 of a three-pole single-throw switch 220, to the ends of one winding 226 of a transformer 228 excited by a suitable oscillator, generally indicated within the dotted line 230. This winding 226 supplies a suitable A. C. operating potential equivalent to the operating potential $e_2$ described in connection with Figure 1.

One end of the strain sensitive resistor 202 is connected as shown through a line 232 to terminal 207. Its other terminal is connected through a line 233 and a circuit terminal 235 to a line 234 which is a grounded connection common to one terminal 236, 236a, etc. of all of the element bridges 204, 204a, etc. This provision of a common grounded connection to one side of all of the strain sensitive resistance elements permits the use of a large number of these elements with the instrument while requiring only a minimum of wires to connect these strain sensitive elements to the instrument proper.

The other terminal 238 of element bridge 204, opposite terminal 236, is connected through contact 217 of switch 220 by a line 240 to a balancing bridge generally indicated at 242, corresponding to balancing bridge 20 of Figure 1. This terminal 238 is adapted to be connected to one of three points in element bridge 204, by a three point switch 244. These points are the connection points between variable resistor 208, fixed resistor 212, fixed resistor 214, and variable resistor 210, respectively. This three point switch 244 and resistors 212 and 214 form a coarse adjustment, and oppositely and continuously variable resistors 208 and 210 form a fine adjustment for balancing the element bridge 204 when the strain sensitive element 202 is in a condition of zero strain or is set at some other reference value for purposes of measurements being made.

Balancing bridge 242 operates generally in the same manner as balancing bridge 20 of Figure 1. Two of its adjacent arms, connected between opposite terminals 244 and 246, comprise fixed resistors 248 and 250, connected in series and joined by a slide wire resistance 256 to two other serially connected fixed resistors 252 and 254, connected to one end of a zero adjustment variable resistor 258. The other two adjacent arms of the balancing bridge 242 are formed of a fixed resistance 260, connected to the other end of the variable zero adjustment resistance 258 connected at a terminal 274 to a temperature compensating resistance element 262 mounted on the stressed body 201 and connected by leads 264 and 266 to this terminal 274 and terminal 244 respectively.

Opposite terminals 244 and 246 of balancing bridge 242 are connected to the ends of a winding 272 of the oscillator transformer 228, to provide a suitable A. C. operating potential equivalent to potential $e_1$ of Figure 1. Terminal 246 is adapted to be adjustably connected to balancing bridge 242 by means of a sliding contact 259 of variable resistance 258 so that its point of connection to the bridge will be adjusted to bring the balancing bridge to a balanced condition prior to the making of measurements. The slide wire 256 provides means for adjusting the balance of balancing bridge 242 by effectively varying the point at which the terminal 276 of the bridge, formed by the sliding contact on slide wire 256, is connected to the bridge circuit. This terminal 276 of the balancing bridge is connected by wire 278 to the high potential terminal 280 of a balance indicator, generally indicated at 282, which is preferably an electronic amplifier and null point detecting device.

The other terminal 284 of balance indicator 282, the low potential or ground terminal, is connected to the common grounded line 234 of the element bridges at terminal 235. The fourth terminal 274 of the balancing bridge 242 opposite terminal 276 is connected through a line 240 to the center contacts 217, 217a, etc. of the element bridge switches 220, 220a, etc.

As described in connection with Figure 1, the balancing bridge 242 may be unbalanced by adjustment of slide wire 256 by an amount equal to the unbalance of element bridge 204 caused by variation in the resistance of the strain sensitive element 202, due to mechanical deformation of the rigid body 201, and slide wire 256 may be calibrated in dimensional units, such as micro-inches, of mechanical deformation or strain.

A range changing or setting adjustment is provided by a shunt circuit, comprising a series connected fixed resistor 286 and a variable resistor 288, connected from the junction between fixed resistors 248 and 250 and fixed resistors 252 and 254. Adjustment of this variable resistor 288 varies the resistance shunting slide wire 256 and thus changes the amount of unbalance which can be produced by a given motion of slide wire contact 276, whereby the range of measurement may be changed. This range-changing adjustment permits the range of the measuring circuit to be adjusted to the "gauge factor" of the strain sensitive elements 202, 202a, etc. The "gauge factor" of the strain sensitive elements may be defined as the change in the absolute value of their resistance for a unit change in strain in the stressed body 201.

The temperature compensating resistance element 262 is preferably identical to the strain elements 202, 202a, etc., and is mounted close to the stressed body 201, so that the temperature of the element will be representative of the temperatures of the strain sensitive elements. The temperature compensating element, however, is so mounted that it is not subject to any strain or deformation caused by strain in the stressed body 201, or change in resistance due to any other cause than temperature change. This temperature compensating or "dummy" element 262 is connected to the balancing bridge 242 by leads 264 and 266, which are substantially identical in length, structure and location to leads 232 and 233 connecting strain sensitive element 202 to element bridge 204. With this arrangement any change in the resistance of the arm of element bridge 204 between terminals 207 and 236 caused by change in the temperature of strain sensitive element 202 or leads 232 and 233, which causes an unbalance of element bridge 204, is compensated for by an equal and opposite unbalance of balancing bridge 242 caused by a similar resistance change resulting from an equal temperature change of the "dummy" element 262 and leads 264 and 266.

The operation of the embodiment shown in Figure 3 is substantially similar to that of the arrangement shown in Figure 1. Thus the advantages gained by using a bridge circuit to balance the element bridges are preserved, and the effect on the measurement of changes in switch resistance is substantially eliminated.

In operation, the balancing bridge 242 is first balanced by adjusting the zero adjustment resistor 258 after connecting the balance indicator 282 directly across the balancing bridge 242 from terminal 274 to terminal 276, as through a switch 290 connecting line 234 to line 240. Thereafter this switch 290 is opened and the element bridges are successively connected to the balancing bridge through switches 220, 220a, etc. As each element bridge is thus connected to the balancing bridge, each element bridge is itself balanced by adjusting the variable resistors 208 and 210 to balance the element bridge at some predetermined zero or reference condition of each of the strain sensitive elements in the bridges. In this operation, the balancing bridge 242 is left in its balanced position, and the variable resistances 208 and 210 are adjusted until the balance indicator 282 indicates a balanced condition.

The mechanism for adjusting the variable resistors 208 and 210 is shown in Figure 4, in which elements corresponding to elements already described in Figure 3 have been assigned the same numbers. In order to provide continuously and oppositely variable changes in the values of resistances 208 and 210, these resistances are formed in a manner similar to the strain sensitive elements 202, 202a, etc. They are affixed one on each side of a flexible cantilever strip 292, securely fastened at one end to a rigid support 294, and attached at the other end to a feed nut 296 arranged to be moved along a threaded portion 298 of a rod 300 rotatably supported in a suitable manner as by collars 302, to a bracket 304, as shown in Figure 4. When rod 300 is rotated to cause feed nut 296 to change its position in the threaded portion 298, this causes the flexible strip 292 to bend in one direction or the other thus putting strain sensitive resistor 208 under compression, and strain sensitive resistor 210 under tension, or vice versa. This changes the values of their resistance and thus the resistance of the arms of the bridge formed by resistors 208, 212, 214, 210, 206 and 202, between terminals 207 and 238 and terminals 238 and 209 in one direction or the other, to permit the element bridge 204 to be brought to a condition of balance for any value of resistance, and therefore any condition of strain of the strain sensitive element 202 which is chosen as a zero or reference value for any particular set of strain measurements.

The strain measuring apparatus shown in Figure 3 offers many advantages not available in devices of this type heretofore known. This "double bridge" balancing arrangement, whereby change in the resistance of the sensitive elements connected in element bridges is measured by the amount of unbalance of a balancing bridge required to balance the unbalance of the element bridge unbalanced by the change of resistance of the strain sensitive element, permits a large number of strain sensitive elements to be sequentially connected to a measuring instrument through usual types of switch structures without the variable switch contact resistance affecting the accuracy of measurement by more than a negligible amount. The provision of A. C. excitation for the two bridges in the "double bridge" circuit has the advantage of eliminating the effect of spurious thermo-electric potentials in the bridge circuits, and it permits the use of a single power source, oscillator 230, to supply operating potential $e_1$ and $e_2$ to the balancing bridge 242 and the element bridge 204, respectively. Thus, any variations in these excitation potentials will always be of equal proportion and in the same direction at the same time so that the resultant double bridge indicator balances will not be influenced by fluctuations of the exciting potentials.

Furthermore, the provision of A. C. excitation for this double bridge arrangement permits the use of a high impedance, high sensitivity, electronic null indicator 282. Also the double bridge circuit permits the grounded side of this electronic null indicator to be connected to the grounded lead 234 which is the common connection to all of the strain sensitive elements.

A frequency of between 500 and 2500, but preferably about 1000 cycles, has been found to be particularly effective. If frequencies below this range are used, as for example the usual commercial power supply line frequency of 60 cycles, then parasitic inductive pickup from power lines may prevent effective balancing of the "double bridge" system. Furthermore, such low frequencies require the use of inordinately large size circuit components in the power supply oscillator as well as in any other associated equipment.

On the other hand the use of frequencies above this range, such as the upper audio-frequencies or supersonic audio-frequencies introduce the problems of leakage effects, capacity effects between various elements of the circuit, and variations due to capacity and inductive effects in the lines 232, 233, 232a, 234, 266, etc., leading to the various strain sensitive elements attached to the structure 201 in which the strain is being measured. For example, to satisfactorily use such higher frequencies it would be necessary to use concentric cable to attach these sensitive elements to the measuring apparatus.

A suitable oscillator and electronic null indicator which has certain advantages for use in the strain measuring apparatus of Figures 1, 2 and 3 is illustrated diagrammatically in Figure 5. The various elements shown schematically on the left-hand side of the dashed line 299 of Figure 3 may be seen more clearly in the more detailed showing of Figure 5. Corresponding elements in these two views have been assigned corresponding reference characters.

The balancing bridge 242 is identical with the balancing bridge shown in Figure 3, and is similarly connected by leads 257 and 269 to winding 272 of transformer 228 of the oscillator 230, whereby the energizing potential $e_1$ is applied to this bridge. The oscillator 230 may be any suitable oscillator capable of supplying an alternating current potential. As mentioned above, a frequency of about 1,000 cycles has been found to be very desirable. In the embodiment shown in Figure 5 the oscillator is a conventional tuned plate push-pull vacuum tube oscillator in which the plate circuit coil 310 and the grid circuit coil 312 are formed of two windings on transformer 228 and are coupled together thereby. The oscillation frequency is determined by the inductance of winding 310, and the capacity of a condenser 314 connected in parallel thereto.

The energizing potential $e_2$ for the element bridges 204, 204a, etc. is applied from a winding 226 of transformer 228 through the conductors 223 and 225, in the manner shown in Figure 3. One of the measuring points across which the unbalanced voltage of the balancing bridge is measured, namely the corner 274 of the bridge, is connected through line 240 to one corner of the element bridge, in the manner shown in Figure 3. The other measuring point of the balancing bridge, namely the slide wire contact 276, is connected through line 278 to the input terminal 280 of the electronic null indicator 282. This input terminal 280 is connected to the primary winding of an input transformer 316 which is connected to the input of a three stage resistance-capacity coupled voltage amplifier generally indicated at 318 of any suitable type. The other terminal 319 of the primary winding of the input transformer 316 is connected to the ground circuit of the amplifier 318 and thence, through terminal 284, to the ground connection 234 common to all of the element bridges 204, 204a, etc. The output of amplifier 318 is connected to the primary of an output transformer 320 having a center-tapped secondary winding whose outside terminals $h$ and $m$ are connected to the diagonal corners $e$ and $g$ respectively of a rectifier bridge consisting of four suitable and substantially identical rectifiers 321, 322, 323 and 324. The oppose corners $d$ and $f$ of this rectifier bridge are connected to the outside terminals $a$ and $b$, respectively, of a center-tapped winding 326 on the oscillator transformer 228. This winding 326 acts as a source of 1,000 cycle A. C. potential electrically insulated from the 1,000 cycle A. C. potential $e_1$ used to excite the balancing bridge 242, and the similarly electrically insulated source of 1,000 cycle A. C. potential $e_2$ used to excite the element bridges 204, 204a, etc. The center tap $k$ of the amplifier output transformer 320 is connected to one side of a sensitive zero-center direct current measuring meter 330, the other side of which is connected to the center tap $c$ of the oscillator transformer winding 326. A condenser 344 is provided across the input winding of output transformer 320 of amplifier 318 to adjust the amount of phase shift the amplifier imparts to the unbalance A. C. voltage being amplified so as to maintain it in proper phase relationship to the rectifier bridge energizing voltage supplied from oscillator transformer winding 326.

With the arrangement just described, it is possible to measure the amount and polarity of the A. C. potential resulting from the change of resistance of any one of the strain sensitive elements 202, 202a, etc. and to make such measurement essentially independent of changes of inductance or of capacity of the circuits connecting the strain sensitive elements to the measuring instrument. That is to say, this is a circuit arrangement which measures the "resistance null" of the element bridge circuit independently of the out of phase unbalance of this circuit, which may exist due to resistance or capacity therein.

As is well known, with any bridge operated on A. C., in order to get a true null, that is a condition of zero potential across the measuring points of the bridge, it is necessary not only that the resistance of the four arms of the bridge shall be in proper relationship, but also that any inductance or capacity effects shall likewise be balanced with respect to each other and to the resistances with which they are associated for the frequency at which the bridge is operating. At the frequency which has been found to be most satisfactory for the operation of apparatus in accordance with the present invention, namely 1,000 cycles, the unbalance potential across the element bridge caused by the capacity of the strain sensitive element and the strain sensitive element leads, and by the inductance of the element and the leads, is appreciable in comparison with that caused by the very minute changes of resistance which must be measured in order accurately to measure the strain of the body being tested. These capacity and inductance effects are of an indeterminate nature and are not easily controlled. However, under normal measuring conditions they remain roughly constant for any individual strain sensitive element connection during the course of a single measurement.

In a practical instrument, it is desirable that these inductance and capacity effects should be negligible. In addition, it is of course necessary that the measurements shall be "directional," that is, that the instrument should differentiate between tension and compression strains. The use of the special measuring apparatus just described for measurement of the amplified A. C. unbalance of the bridge arrangement shown, accomplishes both of these results. This circuit is responsive to components of potential in phase, or 180° out of phase with the potential of the oscillator 230, but it is affected only to a negligible extent by components of potential 90° out of phase with the oscillator potential. Since the changes of resistance in the strain sensitive elements resulting from a straining thereof are almost exactly in phase with the oscillator voltage, these resistance changes have full effect on the measuring system, whereas any potentials set up in the bridge circuits by capacity or inductance of the strain sensitive elements or their leads are effectively 90° out of phase with the potential of the oscillator, and hence have little effect on the measurement. Even in the case of considerable amounts of inductance or capacity effects, the exact point of null balance will be shifted only slightly. The effect of this inductance or capacity usually remains the same in the unstrained or strained position of the elements, and hence any such shift of the null point has no effect on the difference readings which are the measurement of the strain to which the elements are subjected. Thus, the strain measuring arrangement just described measures the resistance null and the amount and direction of variation of resistance from this null by measurement of a component of unbalanced potential in phase with the oscillator component, caused by resistance change alone, and it measures this null in spite of out of phase potentials which may be set up in the bridge by inductance or capacity in the measuring circuits. Further, the additions of inductance or capacity in the measuring variable, or in its connections, of the order which might be encountered in actual operation, have a minimum effect on the value of the null indication; and fixed amounts of inductance or capacity in the measuring variable, or its connections, have no effect on the change of resistance of the strain sensitive elements being measured by the arrangement.

The means by which this is accomplished may be more easily understood by considering in greater detail the operation of the null indicator. Assuming that the balancing bridge 242 and the element bridge 204 are in balance, and hence that there is a zero potential applied through input transformer 316 to the input of amplifier 318, and therefore across the terminals $h$ and $m$ of output transformer 320; and also assuming that at a given instant the current flow in the 1,000 cycle source, transformer winding 326, is from $a$ to $b$, then the current flows from $f$ to $d$ through rectifiers 323 and 324 and from $d$ back to $a$, no current flows through rectifiers 321 and 322. With zero potential across the secondary of transformer 320, the indicating meter 330 is effectively connected between the electrical mid-point $c$ of the 1,000 cycle source 326 and the mid-point $g$ of the rectifier bridge. Since the indicator 330 is connected from mid-point to mid-point, there is no potential drop from $g$ to $c$ and hence no current flows through the indicator 330. If we assume that for a given instant the current in the 1,000 cycle source 326 is from $b$ to $a$, the current flow now is from $a$ to $d$, through rectifiers 322 and 321, and from point $f$ back to $b$. The indicator 330 is now effectively connected between mid-point $c$ and mid-point $e$ of the rectifier bridge, and just as before, there is no current flow through the indicator 330. If we now assume that the balancing bridge 242 and the element bridge 204 are not equally and oppositely balanced so that there is a residual unbalance in such a direction that for a given instant, if the current flow in the 1,000 cycle source 326 from $a$ to $b$, the current flow in the output transformer 320 is from $h$ to $m$, the current flow from the secondary winding of transformer 320 is from $m$ to $g$, through rectifiers 324 and 322 and from $e$ back to $h$; while as before, the current from the 1,000 cycle oscillator winding 326 flows from $b$ to $f$, through rectifier 323 and 324, and from $d$ back to $a$. Thus it can be seen that there is passing through rectifier 323 only current from the 1,000 cycle source, while rectifier 324 is passing, in addition to current from the 1,000 cycle source, current from the amplifier output transformer 320. Thus point $g$ is no longer the electrical mid-point of the rectifier bridge and there is now a potential drop between points $g$ and $c$ so that the indicator 330 indicates the amount of unbalance in the proper direction.

Next, assuming that the double bridge circuit is unbalanced in the opposite direction so that for a given instant, with the current flow in the 1,000 cycle oscillator winding 326 from $a$ to $b$, the current flow in the amplifier output transformer 320 is from $m$ to $h$. Then the current flow from transformer 320 flows from $h$ to $e$, through rectifiers 321 and 323, and from point $g$ back to terminal $m$ of transformer 320, while the current from the transformer winding 326 flows as described above. Under this new condition, it can be seen that now there is passing through rectifier 324 only current from the oscillator transformer winding 326, and rectifier 323 is passing current from amplifier output transformer 320 in addition to the current from the oscillator. In this case, also, point $g$ is no longer the electrical mid-point of the rectifier bridge, but is unbalanced in the opposite sense from the unbalance described above, the potential drop between points $g$ and $c$ now being reversed in sign from that previously mentioned, and the indicator 330 shows the amount of unbalance but in a direction opposite to that previously described.

Thus, it can be seen that this measuring circuit for measuring the amplified A. C. unbalance of the double bridge circuit results in an indicating system which not only demonstrates the amount of unbalance of the measuring circuit, but also the direction of unbalance.

Now assuming that there is present in the double bridge circuit, and hence in the output of transformer 320 of amplifier 318, a potential which is 90° out of phase with the potential of the 1,000 cycle source 326, and that the direction of current flow in this source is from $a$ to $b$, as before, the currents flows from $b$ to $f$, through rectifier 323 and 324, and from $d$ back to $a$. During that period of the cycle in which the current flow in the 1,000 cycle source 326, is in the direction assumed, the current flow from the amplifier output transformer 320 will flow in the direction from $h$ to $m$ half of the time and from $m$ to $h$ the other half of the time. Thus, during the period of the cycle just mentioned, current flows through indicator 330 half of the time in one direction and half of the time in the other direction as the result of the rectifier bridge unbalance caused by the current from transformer 320. Because the frequency of the 1,000 cycle current is high compared with the natural period of the D. C. indicating instrument 330, there is no resultant observable movement of the indicator.

From this discussion it can be seen that the measuring instrument above described is responsive to components of the unbalanced potential in phase with the potential of the oscillator 230, but that it is unaffected by components of potential 90° out of phase with the oscillator potential. Thus the resultant unbalance impressed onto the null indicator 282 due to unbalance of the element bridge 204 caused by inductance and capacity effects in the leads 232 and 233 leading to the strain sensitive element 202 has substantially no effect on the strain measurement made by the adjustment of the balancing bridge 242 in response to change in the resistance of the strain sensitive element 202.

Instead of connecting an indicator instrument, such as that shown in Figure 5, in the double bridge mechanical strain measuring apparatus of Figures 1, 2 and 3, it is possible to use a recording mechanism preferably composed of an automatic self-balancing device for adjusting the balance of the balancing bridge 242 and an automatic switching mechanism for automatically sequentially operating the switches 220, 220a, etc. to connect the element bridges 204, 204a, etc. successively to the balancing bridge so that a continuous record may be made of a series of mechanical strain measurements in the stressed body 201. Figure 6 shows schematically such an automatic recording arrangement which may be substituted for the apparatus shown to the left of the dashed-line 299 of Figure 3 by connecting the conductors 234, 223, 225 and 240 to the corresponding conductors of the apparatus shown to the right of dashed-line 299 in Figure 3. This automatic recording mechanism may be broken down into several principal sections. In common with the mechanical strain indicator shown in Figure 5, there is a balancing bridge circuit, generally indicated at 350, a bridge output voltage amplifier, generally indicated at 352, a phase recognition system, generally indicated at 354, and a 1,000 cycle oscillator, generally indicated at 356. In addition, this recorder system is provided with a power supply, generally indicated at 358, adapted to be operated from the usual commercial A. C. supply line, a power amplifier stage, generally indicated at 360, operated by the output of the phase detecting circuit 354, and a balancing motor, generally indicated at 362, which is driven by the power stage 360 and operates to adjust the balancing bridge 350 to a point where the double bridge circuit is in balance.

There is also provided in the recorder an automatic switching relay generally indicated at 364, operated when the double bridge system reaches a point of balance to drive the recorder 382 to another position to indicate the next element bridge to be measured. When the recorder chart drive has advanced to the next position, this automatic switching mechanism then operates to switch the element bridge switches 220, 220a, etc. sequentially to connect the next element bridges 204, 204a, etc. to be measured, to the balancing bridge 350. The balancing bridge itself contains two resistance arms 366 and 368 which are in balance with two capacitive arms 370 and 372, one of which, 370, is semi-adjustable and one of which, 372, includes a variable air condenser. This condenser 372 is driven by the balancing motor 362 through a mechanical linkage, generally indicated by the dashed line 374, to provide the self-balancing of the balancing bridge. The balancing bridge also contains a variable element to provide a "gauge factor" adjustment. This is formed of a variable resistance 376. A variable resistance 378 is also provided to permit a "zero" adjustment to bring the recording pen, generally indicated at 380, to zero on a record chart, shown partially and schematically at 382. The balancing bridge 350 is energized from one winding 384 of a 1,000 cycle oscillator transformer 386. Another winding 388 of the oscillator transformer 386 is provided with a tap 390, a set of series resistances 392 of various values, and a single-pole multi-connection switch 394, whereby the energization voltage $e_2$ is supplied to the element bridges 204, 204a, etc. and with the provision for the selection of one of a plurality of ranges for the recorder. The bridge output voltage amplifier 352 in the arrangement shown in Figure 6, is a standard resistance-capacity coupled amplifier. It is connected to the high voltage 396 of the power supply 358 through a resistance-capacity filter network, generally indicated at 398, provided to insure stability of the amplifier 352 in operation. The output of the bridge voltage amplifier 352 is fed to the phase recognition stage 354. This phase recognition circuit 354 comprises two vacuum tubes, such as the triodes 400 and 402, with their grids connected in parallel and their plate circuits separately energized by two separate windings 404 and 406 respectively, of the oscillator transformer 386. This circuit responds to the phase difference between the amplified bridge output voltage and the 1,000 cycle voltage introduced from the oscillator 356 by the windings 404 and 406, so that one or the other of these two tubes 400 or 402 is energized, depending upon whether the amplifier output voltage is in phase or 180° out of phase with the voltage from oscillator 356. The energized tube passes current of a magnitude dependent upon the magnitude of the amplifier output voltage, i. e., the unbalanced voltage from the double bridge circuit. Operating in this manner, the phase recognition circuit 354 develops a D. C. voltage across one or the other of two resistors 408 and 410, which voltage is in turn impressed upon the grids of the two power tubes 412 and 414 in the power output amplifier stage 360. This stage is operated as a D. C. amplifier of conventional design. The output of the power amplifier stage 360 is used to drive the balancing solenoid motor 362 which adjusts the balancing arm of the balancing bridge 350, which arm in this instance is the variable air condenser 372. The balancing motor 362 is a center-tapped solenoid 416, the ends of which are connected to the plates of power tube 412 and 414, and the center tap of which is connected to the high voltage line 396 of power supply 358. Thus, the solenoid 416 is, in effect, a pair of co-axially mounted solenoid coils connected in push-pull. The moving part of the motor is a reciprocating cylindrical core 418 of magnetic material suspended substantially in the center of the solenoid 416. As shown for example in Electrical Engineers' Handbook, Harold Pender—Editor in Chief (John Wiley & Sons, Inc., 1936), Sec. 4—35 and 4—36, the pull of a solenoid on a core is independent of the position of the core over a substantial range of distance. The core 418 is, of course, of such length and is positioned so that it moves within this region of uniform pull. This core 418 is connected by the linkage system, shown diagrammatically by the dotted lines 374, to the rotor of the balancing bridge variable air condenser 372 and to the recording pen 380. The values of the various elements of the power amplifying stage 360 are so chosen that the driving coils of the solenoid motor 362 are continuously and equally energized by the power supply 358 through the two tubes 412 and 414 of the power output circuit. When an unbalanced voltage exists in the double bridge circuit and is amplified by the amplifier 352, the resulting amplified output unbalance from the power output stage 360 unbalances the current through both halves of the solenoid 416. The resulting magnetic unbalance of the solenoid moves the motor armature or core 418 to drive the rotor of the variable condenser 372 in such a direction as to produce an unbalance of the balancing bridge 350 equal and opposite to the unbalance of the element bridge 204, so as to reduce to zero the unbalance voltage supplied to amplifier 352 until the current through the two halves of the motor solenoid 416 again becomes equal and the core 418 stops moving. The action of the motor 362 is such that the direction of movement of the core 418 depends only on the relative magnitudes of the currents through the two halves of solenoid 416 and is unaffected by the position of the core 418.

To the armature 418 may be suitably attached a damping means such as a mechanical dash pot to offset any tendency of the balancing motor to oscillate across the null position when the recording mechanism is adjusted for very high sensitivity.

In order to correct any phase shift which may occur in voltage amplifier 352 and in the input of the phase recognition circuit 354, a resistance-capacity network comprising a condenser 420 and a resistor 422 is provided in amplifier 352, and a condenser 424 in the input circuit of phase recognition circuit 354, to adjust the phase of the amplified voltage so as to insure that the phase recognition circuit 354 operates effectively only on amplified unbalance voltages from amplifier 352 which are either in phase with or 180° out of phase with the voltage from the oscillator 356. Under this condition, it is affected only to a negligible extent by components of potential 90° out of phase with the oscillator voltage in a manner similar to the operation of the rectifier bridge system described above in connection with Figure 5.

The automatic switching mechanism 364, mentioned above, comprises a relay having a winding 426 connected parallel with the entire winding 416 of the solenoid balancing motor 362 and a relay contact arrangement 427, adapted to open when the relay solenoid 426 is deenergized. The contacts 427 are connected in series with a power supply 423 and the winding of a delayed action relay 429 which is provided with contacts 421 adapted to be closed when the relay 429 is energized. These contacts 421 are connected across an electric chart drive motor 431 which is energized from a power supply 425 through a current limiting resistor 425'. With this arrangement operation of the chart drive motor 431 may be controlled by closing the contacts 421 to stop the motor by shorting it. In addition to driving the chart 382, the motor 431 drives a notched cam 433 which normally holds a single-pole double throw switch 435 in one position but once in each revolution moves this switch to its other position when the cam follower drops into the notched portion of the cam. Two terminals of this switch 435 are connected in parallel with the contacts 427, relay 426 as shown, and one of these contacts and the remaining contact are connected in series with a power supply 428 and an electro-magnet 430 which is adapted to operate a mechanical mechanism schematically shown as a biased rocker arm link 432. This mechanism 432 is connected by some suitable mechanical structure schematically shown in Figures 3 and 6, by the dashed line 434, to the element bridge switches 220, 220a, etc. When the instrument shown in Figure 6 is not in balance so that the current flowing through both halves of the solenoid winding 416 are of unequal values, the potential supply across relay winding 426 is sufficient to energize the relay and hold contacts 427 in closed position. Under this condition relay 429 is energized and contacts 421 are closed. At this time, chart drive motor 431 is stopped because it is shorted through contacts 421 and the upper contact of switch 435, because the cam follower rests in the notch of cam 433. When the recording instrument reaches a condition of balance so that the currents flowing through both halves of solenoid winding 416 are substantially equal and opposite and the armature core is stationary, the potential supplied across relay winding 426 drops to a minimum value and contacts 427 open. This deenergizes relay 429 to open contacts 421 and remove the short across the chart drive motor 431. The chart drive motor then operates to advance the chart 382 to the next position, thereby making a record of the balance point just obtained, and at the same time rotates cam 433 to move the switch 435 to its alternate position, short-circuiting contacts 427 and re-energizing relay 429 to close contacts 421. This does not short-circuit the motor 431, however, because the upper contact of switch 435 is opened due to the position of the cam 433. When the next chart position is reached and the cam 433 has moved through one revolution, the upper contact of switch 435 is closed to energize electromagnet 430 to operate the mechanical mechanism 432 to open the element bridge switch that was just closed, and to close the next switch in the series to connect its element bridge to the measuring apparatus for the next balancing operation. This closure of the upper contact of switch 435 likewise stops the operation of chart drive motor 431 by renewing the short-circuit thereacross through the contact 421 of relay 429. The contacts 421 of relay 429 which, due to its time delay action, are held in a closed position for a short period of time even after the balancing is accomplished. Hence the mechanism does not start the chart drive motor until a short time after the balancing is completed. Thus time is assured for completing the switching operation. This sequential switch operation may be accomplished by any suitable mechanical structure known in the art. Such an arrangement might comprise a three-pole multi-throw rotary switch mounted on a shaft which is rotated from one set of contacts to the next by a step-by-step ratchet wheel actuated by the linkage 434. This ratchet wheel is operated one step each time. The electromagnet 430 is energized as a result of the sequential operation thus described which occurs whenever a measurement balance is reached and relay coil 426 is de-energized. This mechanical switching structure does not per se form a part of the present invention. With such an arrangement as just outlined, the balancing bridge and the electronic recorder shown in Figure 6 are automatically connected to the next element bridge to be measured as soon as each preceding measurement is completed.

As mentioned above, a frequency of 1,000 cycles has been found to be particularly advantageous as an operating frequency with the apparatus of the present invention herein described. This is especially true when using a self-balancing instrument of the type illustrated in Figure 6, because it permits the components of the balancing bridge 350, such as the variable capacity air condenser 372, to be of reasonable size. This would not be possible if a lower frequency such as the ordinary commercial supply line frequency of 60 cycles was used. Nor does it necessitate the use of elaborate shielding systems in the balancing bridge and amplifier structures, nor the use of co-axial cables to connect various portions of the apparatus and the condition sensitive elements, which arrangements would be necessary if higher frequencies were employed.

Considering the apparatus shown in Figure 6, and especially the balancing bridge 350, representative values of the electrical components which have been found to permit efficient operation are outlined below. The winding 384 of oscillator transformer 386 supplies an A. C. voltage of approximately six volts to the balancing bridge 350. This voltage is applied across a zero adjustment circuit formed as a fixed resistance 438 of about 1,000 ohms connected in series with a variable zero-adjustment resistor 378 of about 2,000 ohms and another fixed resistance 440 of about 1,000 ohms. It also is connected to two voltage-limiting series resistors 442 and 444 of about 120 ohms each, one being connected in each line from the winding 384. The variable range-changing or "gauge factor" resistance 376 is about 50 ohms. The two fixed resistances 366 and 368 forming two arms of the bridge are substantially identical resistors of about 6 ohms each. The variable condenser 372 is variable throughout a range of about 50 to 150 micro-micro-farads and is shunted by an air dielectric tank condenser 446 of about 1,000 micro-microfarads capacity. The fourth arm of the bridge comprises another air dielectric tank condenser 448 of about 1,000 micro-micro-farads capacity shunted across the semi-variable air condenser 370 which may be pre-set to bring the bridge into approximate balance at some normal null condition. These tank condensers 446 and 448 offer a sufficiently low impedance at 1,000 cycles so that these two arms of the bridge each have an impedance comparable to the other two arms of the bridge. A measuring bridge having electrical component values approximately equal to those just described has been found to work very efficiently with element bridges having approximately 120 ohms per leg as described above in connection with Figure 3.

Although the electronic null indicator instrument shown in Figure 5 and the self-balancing electronic recorder shown in Figure 6 have been described in connection with a multiple element double bridge balancing system in which a balancing bridge is unbalanced by an amount equal to the unbalance of an element bridge to measure the change in a condition, these instruments may also be used continuously to measure and indicate or record the variations in the electrical characteristic of a single condition sensitive element. If they are used in such a system, the double bridge arrangement may be dispensed with to simplify the apparatus because its ability to minimize variable contact resistance effects is not needed when the condition sensitive element can be connected to the measuring apparatus with permanent connections.

Thus, in the arrangement shown in Figure 5, if line 234 is connected to line 240, as by the shorting switch 290 of Figure 3, and a strain gauge resistance element, or other condition sensitive impedance, is connected in the balancing bridge circuit in place of the temperature compensating "dummy" element 262, this apparatus may be operated as a "single bridge" measuring circuit. When so connected, the balancing bridge 242 will be unbalanced by change in the resistance of the strain gauge element, substituted for the "dummy" element 262, caused by change in the strain being measured, and rebalanced by adjustment of sliding contact 276 on slide wire 256 until the electronic indicator indicates a null. With this arrangement the position of the sliding contact 276 can be as easily calibrated directly in units of strain as in the case when the null indicator is used in the double bridge system previously described.

Similarly, the self-balancing recorder instrument shown in Figure 6 can be arranged to measure continuously the change in the value of a single condition by connecting line 234 to line 240, as by the shorting switch 290 of Figure 3, and by substituting a condition sensitive impedance element, such as a strain gauge resistance element, for one of the bridge arm resistors 366 or 368 of balancing bridge 350. When unbalanced by change of the condition being measured, it is rebalanced by adjustment of the variable condenser 372 through the operation of the solenoid motor 362 as outlined in connection with the double bridge system described above. With this arrangement, the change in the value of a single condition sensitive element can be rapidly and continuously recorded on the chart 382 by the pen 380. The automatic switching arrangement 364—434 is not needed in such a system.

It is clear that in an automatic rebalancing arrangement, such as has been described here, that the rebalancing mechanism is moving only when the system is not in balance so that any of the moving parts may serve as a balance indicating means. Thus the core 418, the recorder element 382, or the condenser 372 may act as balance indicating means.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

I claim:

1. In apparatus of the class described, in combination, a transformer having a primary winding and two secondary windings, said primary winding being associated with a source of A. C. power, a balanceable element bridge circuit having input and output terminals, one of said secondary windings being connected to the input terminals of said element bridge to energize said bridge, an impedance element forming a part of said element bridge circuit and variable in response to variations in a condition to be measured to produce an unbalance A. C. potential at the output terminals of said bridge which is a function of the variations in said condition, a balancing bridge circuit having input and output terminals, the other of said secondary windings being connected to the input terminals of said balancing bridge to energize said bridge, an adjustable impedance forming part of said balancing bridge circuit and variable to produce an unbalance A. C. potential at the output terminals of said balancing bridge circuit, electric circuit means connecting the output terminals of said element bridge and said balancing bridge to oppose said unbalance A. C. potentials, and balance-indicating means connected to said circuit means to indicate when said unbalance potentials are equal, whereby variations in said condition may be measured by measurement of the adjustment of said adjustable impedance necessary to produce an indication of balance on said indicating means.

2. Apparatus as claimed in claim 1 wherein said impedance element in said element bridge circuit is a resistance element and said adjustable impedance in said balancing bridge circuit is an adjustable resistance element.

3. In apparatus of the class described, in combination, a transformer having a primary winding and two secondary windings, said primary winding being associated with a source of A. C. power, a balanceable element bridge circuit having input and output terminals one of said secondary windings being connected to the input terminals of said element bridge to energize said bridge, an impedance element forming a part of said element bridge circuit and variable in response to variations in a condition to be measured to produce an unbalance A. C. potential at the output terminals of said bridge which is a function of the variations in said condition, a balancing bridge circuit having input and output terminals, the other of said secondary windings being connected to the input terminals of said balancing bridge to energize said bridge, an adjustable impedance forming part of said balancing bridge circuit and variable to produce an unbalance A. C. potential at the output terminals of said balancing bridge circuit, null indicator means, electric circuit means connecting the output terminals of said element bridge, the output terminals of said balancing bridge and said null indicating means in series to oppose said unbalance A. C. potentials, whereby variations in said condition may be measured by measurement of the adjustment of said adjustable impedance necessary to produce a null indication on said indicator means.

4. In a measuring system for successively measuring the value of several condition sensitive elements wherein a single measuring apparatus is to be switched from one to another of the elements and wherein these removable connections have a finite resistance subject to significant variation, a plurality of balanceable element bridge circuits each having input and output terminals, a first source of electric potential for energizing said element bridges, a plurality of impedance elements each forming a part of one of said element bridge circuits and each being variable in response to variations in a condition to be measured to produce unbalance potentials at the output terminals of said bridges, each of which potentials is a function of the variations in said conditions, a balancing bridge circuit having input and output terminals, a second source of electric potential connected to the input terminals of said balancing bridge for energizing said bridge, an adjustable impedance forming part of said balancing bridge circuit and variable to produce an unbalance potential at the output terminals of said balancing bridge circuit, circuit connecting means adapted to connect the output terminals of one of said element bridges and the output terminals of said balancing bridge, balance-indicating means in said circuit connecting means to indicate when said unbalance potentials are equal and opposite, and switching means for changing said circuit connecting means selectively to connect the input terminals of a selected element bridge to said first source of electrical potential and simultaneously connecting the output terminals of the same element bridge to the output terminals of said balancing bridge, whereby variations in the condition to which said selected element bridge is associated may be measured accurately by measurement of the adjustment of said adjustable impedance means necessary to produce an indication of balance on said balance-indicating means in spite of variations in the contact resistance of said switching means.

5. In a measuring system for successively measuring the value of several condition sensitive elements wherein a single measuring apparatus is to be switched from one to another of the elements and wherein these removable connections have a finite resistance subject to significant variation, a transformer having a primary winding and first and second secondary windings, said primary winding being associated with a source of A. C. power, a plurality of balanceable element bridge circuits each having input and output terminals, said first secondary winding of said transformer being designed to be connected selectively to the input terminals of said element bridges to energize said bridges, a plurality of elements each forming a part of one of said element bridge circuits and each being variable in response to variations in a condition to be measured to produce unbalance A. C. potentials at the output terminals of said bridges, which potentials are functions of the variations in said conditions, a balancing bridge circuit having input and output terminals, said second secondary winding being connected to the input terminals of said balancing bridge to energize said bridge, an adjustable impedance forming part of said balancing bridge circuit and variable to produce an unbalance A. C. potential at the output terminals of said balancing bridge circuit, circuit connecting means adapted to connect the output terminals of one of said element bridges and the output terminals of said balancing bridge, balance-indicating means in said circuit connecting means to indicate when said unbalance A. C. potentials are equal and opposite, and switching means for changing said circuit connecting means selectively to connect the input terminals of a selected element bridge to said first secondary winding and simultaneously connecting the output terminals of the same bridge to said output terminals of said balancing bridge, whereby variations in the condition to which said selected element bridge is responsive may be measured accurately in spite of variations in the contact resistance of said switching means by measurement of the adjustment of said adjustable impedance means necessary to produce an indication of balance on said balance-indicating means.

6. In a measuring system for successively measuring the value of several condition sensitive elements wherein a single measuring apparatus is to be switched from one to another of the elements and wherein these removable connections have a finite resistance subject to significant variation, a transformer having a primary winding and first and second secondary windings, said primary winding being associated with a source of A. C. power, a plurality of balanceable element bridge circuits each having input and output terminals, said first secondary winding of said transformer being designed to be connected selectively to the input terminals of said element bridges to energize said bridges, a plurality of elements each forming a part of one of said element bridge circuits and each being variable in response to variations in a condition to be measured to produce unbalance A. C. potentials at the output terminals of said bridges, which potentials are functions of the variations in said conditions, a balancing bridge circuit having input and output terminals, said second secondary winding being connected to the input terminals of said balancing bridge to energize said bridge, an adjustable impedance forming part of said balancing bridge circuit and variable to produce an unbalance A. C. potential at the output terminals of said balancing bridge circuit, a common grounded circuit connected to one of the output terminals of each of said element bridges, null indicating means connected to said common circuit and to one output terminal of said balancing bridge, and a three-pole multiple-throw switching means for selectively connecting the input terminals of a selected element bridge to said first secondary winding and simultaneously connecting the other output terminal of the same element bridge to the other output terminal of said balancing bridge, whereby variations in the condition to which said selected element bridge is responsive may be measured accurately in spite of variations in the contact resistance of said switching means by measurement of the adjustment of said adjustable impedance means necessary to produce a null indication on said indicating means.

7. In a measuring system wherein connections must be made through means having a finite resistance that is subject to variation, apparatus comprising a transformer having a primary winding and first and second secondary windings, said primary winding being associated with a source of A. C. power, a plurality of balanceable element bridge circuits each having input and output terminals, said first secondary winding of said transformer being designed to be connected selectively to the input terminals of said element bridges to energize said bridges, a plurality of elements each forming a part of one of said element bridge circuits and each being variable in response to variations in a condition to be measured to produce unbalance A. C. potentials at the output terminals of said bridges, which potentials are functions of the variations in said conditions, a balancing bridge circuit having input and output terminals, said second secondary winding being connected to the input terminals of said balancing bridge to energize said bridge, an adjustable impedance forming part of said balancing bridge circuit and variable to produce an unbalance A. C. potential at the output terminals of said balancing bridge circuit, a common grounded circuit connected to one of the output terminals of each of said element bridges, a high input impedance null-current indicating device including a vacuum tube having a cathode, anode and control grid an indicating meter connected in the anode circuit of said tube, a high input impedance connected between the cathode and control grid of said tube, the control grid circuit of said tube being connected to one output terminal of said balancing bridge and the cathode circuit of said tube being connected to said common grounded circuit, and a three-pole multiple-throw switching means for selectively connecting the input terminals of a selected element bridge to said first secondary winding and simultaneously connecting the other output terminal of the same element bridge to the other output terminal of said balancing bridge, whereby variations in the condition to which said selected element bridge is responsive may be measured accurately in spite of variations in the contact resistance of said switching means by measurement of the adjustment of said adjustable impedance means necessary to produce an indication on said meter corresponding to a zero current flow through said vacuum tube input impedance.

8. In a measuring system for successively measuring the value of several condition sensitive elements wherein a single measuring apparatus is to be switched from one to another of the elements and wherein these removable connections have a finite resistance subject to significant variation, a plurality of balanceable A. C. strain gage element bridge circuits each having input and output terminals, a first source of A. C. potential for energizing said element bridges, a plurality of strain gage resistance elements each forming a part of one of said element bridge circuits and each being mechanically attached at a predetermined point to said stressed member to be stressed simultaneously therewith thereby to change its resistance and unbalance its element bridge to produce unbalance A. C. potentials at the output terminals of said bridges, which potentials are functions of the variations in the stress of said stressed member at said predetermined points, a balancing bridge circuit having input and output terminals, a second source of A. C. electric potential connected to the input terminals of said balancing bridge for energizing said bridge, an adjustable impedance forming part of said balancing bridge circuit and variable to produce an unbalance potential at the output terminals of said balancing bridge circuit, circuit connecting means adapted to connect the output terminals of one of said strain gage element bridges to the output terminals of said balancing bridge, balance-indicating means in said circuit connecting means to indicate when said unbalance potentials are equal and opposite, and switching means for changing said circuit connecting means selectively to connect the input terminals of a selected element bridge to said first source of electrical potential and simultaneously connecting the output terminals of the same element bridge to the output terminals of said balancing bridge, whereby variations in the stress of said stressed member at the point to which said selected strain gage element is attached may be measured accurately in spite of variations in the contact resistance of said switching means by measurement of the adjustment of said adjustable impedance means necessary to produce an indication of balance on said balance-indicating means.

9. In a measuring system wherein connections must be made through means having a finite resistance that is subject to variation, apparatus comprising in combination, a transformer having a primary winding, and first, and second and third secondary windings, said primary winding being associated with a source of A. C. power, a balanceable A. C. strain gage element bridge having input and output terminals, said first secondary winding being connected to the input terminals of said element bridge to energize said bridge, a strain gage resistance forming a part of said bridge and mechanically attached to said stressed member to be stressed simultaneously therewith thereby to change its resistance and unbalance said bridge to produce an unbalance A. C. potential at the output terminals of said bridge which is a function of the variations in the strain of said stressed member, a balancing bridge having input and output terminals, said second secondary winding being connected to the input terminals of said balancing bridge to energize said bridge, an adjustable resistance forming part of said balancing bridge and variable to produce unbalance A. C. potential at the output terminals of said balancing bridge, electric circuit means connecting the output terminals of said element bridge and said balancing bridge in series to oppose said unbalance A. C. potentials, said circuit connecting means including contact members having a finite resistance that is subject to small variations, indicating means connected in said series circuit responsive in magnitude of indication to the magnitude of the resultant unbalance potential therein, phase discriminating means connected to said indicating means and to said third secondary winding responsive to the phase of the resultant A. C. potential and the A. C. potential from said third winding to move said indicating means in a direction corresponding to the direction of unbalance of said resultant potential, whereby the magnitude and direction of variations in the strain in said stressed member may be measured by measurement of the adjustment of said adjustable resistance necessary to produce a null indication on said indicating means.

10. Apparatus for measuring the strain in a stressed member, comprising, in combination, a plurality of balanceable A. C. strain gage element bridge circuits each having input and output terminals, a first source of A. C. potential for energizing said element bridges, a plurality of strain gage resistance elements each forming a part of one of said element bridge circuits and each being mechanically attached at a predetermined point to said stressed member to be stressed simultaneously therewith thereby to change its resistance and unbalance its element bridge to produce unbalance A. C. potentials at the output terminals of said bridges, which potentials are functions of the variations in the stress of said stressed member at said predetermined points, a balancing bridge circuit having input and output terminals, a second source of electric potential connected to the input terminals of said balancing bridge for energizing said bridge, an automatically operated adjustable impedance forming part of said balancing bridge circuit and variable to produce an unbalance potential at the output terminals of said balancing bridge circuit, balance-responsive means adapted to be connected to the output terminals of one of said strain gage element bridges and the output terminals of said balancing bridge to detect when said unbalance potentials are equal and opposite, motor means under control of said balance-responsive means for operating said adjustable impedance, means for recording the value of said adjustable impedance necessary to obtain said balancing potential, switching means for selectively and sequentially connecting the input terminals of a selected element bridge to said first source of electrical potential and simultaneously connecting the output terminals of the same element bridge to said balance-responsive means and the output terminals of said balancing bridge, and automatic means responsive to said balance responsive means when a condition of balance exists between said unbalance potentials to operate said recording means, and means responsive to the operation of said recording means to operate said switching means to connect the next selected element bridge to said balancing circuit.

11. In a system for measuring the strain in a stressed member wherein the electrical connections in the apparatus are subject to variations in resistance apparatus comprising in combination, a transformer having a primary winding and first and second secondary windings, said primary winding being associated with a source of A. C. power, a balanceable A. C. strain gage element bridge having input and output terminals, said first secondary winding being connected to the input terminals of said element bridge to energize said bridge, a strain gage resistance forming a part of said bridge and mechanically attached to said stressed member to be stressed simultaneously therewith thereby to change its resistance and unbalance said bridge to produce an unbalance A. C. potential at the output terminals of said bridge which is a function of the variations in the strain of said stressed member, a balancing bridge having input and output terminals, the other of said secondary windings being connected to the input terminals of said balancing bridge to energize said bridge, an adjustable resistance forming part of said balancing bridge and variable to produce an unbalance A. C. potential at the output terminals of said balancing bridge, electric circuit means connecting the output terminals of said element bridge and said balancing bridge in series to oppose said unbalance A. C. potentials, said circuit connecting means including contact members having a finite resistance that is subject to small variations, and null indicating means connected in said series circuit to indicate when said unbalance A. C. potentials are equal, whereby variations in the strain in said stressed member may be measured by measurement of the adjustment of said adjustable resistance necessary to produce a null indication on said indicating means.

12. Apparatus for measuring the strain in a stressed member, comprising, in combination, a plurality of balanced strain gage element bridge circuits each having input and output terminals, a first source of potential for energizing said element bridges, a plurality of strain gage resistance elements each forming a part of one of said element bridge circuits and each being mechanically attached at a predetermined point to said stressed member to be stressed simultaneously therewith thereby to change its resistance and unbalance its element bridge to produce unbalance potentials at the output terminals of said bridges, which potentials are functions of the variations in the stress of said stressed member at said predetermined points, a balancing bridge circuit having input and output terminals, a second source of electric potential connected to the input terminals of said balancing bridge for energizing said bridge, an adjustable impedance forming part of said balancing bridge circuit and variable to produce an unbalance potential at the output terminals of said balancing bridge circuit, circuit connecting means adapted to connect the output terminals of one of said strain gage element bridges to the output terminals of said balancing bridge, balance-indicating means in said circuit connecting means to indicate when said unbalance potentials are equal and opposite, and switching means for changing said circuit connecting means selectively to connect the input terminals of a selected element bridge to said first source of electrical potential and simultaneously connecting the output terminals of the same element bridge to the output terminals of said balancing bridge, whereby variations in the stress of said stressed member at the point to which said selected strain gage element is attached may be measured accurately in spite of variations in the contact resistance of said switching means by measurement of the adjustment of said adjustable impedance means necessary to produce an indication of balance on said balance-indicating means.

13. In a system for measuring the strain in a stressed member wherein at least some of the connections must be made through elements having a finite resistance and which is subject to variations under the operating conditions, apparatus comprising a transformer having a primary winding and first and second secondary windings, said primary winding being associated with a source of A. C. power, an A. C. strain gage element bridge having input and output terminals, said first secondary winding being connected to the input terminals of said element bridge to energize said bridge, a strain gage resistance forming a part of said bridge and mechanically attached to said stressed member to be stressed simultaneously therewith thereby to change its resistance and unbalance said bridge to produce an unbalance A. C. potential at the output terminals of said bridge which is a function of the variations in the strain of said stressed member, a balancing bridge having input and output terminals, the other of said secondary windings being connected to the input terminals of said balancing bridge to energize said bridge, an adjustable resistance forming part of said balancing bridge and variable to produce an unbalance A. C. potential at the output terminals of said balancing bridge, electric circuit means inter-connecting the output terminals of said element bridge and said balancing bridge to oppose said unbalance A. C. potentials, said circuit connecting means including contact members having a finite resistance that is subject to small variations, and null indicating means connected in said circuit means to indicate when said unbalance A. C. potentials are equal, whereby variations in the strain in said stressed member may be measured by measurement of the adjustment of said adjustable resistance necessary to produce a null indication on said indicating means.

14. Apparatus for measuring the strain in a stressed member comprising, in combination, a transformer having a primary winding and first and second secondary windings, said primary winding being associated with a source of A. C. power, an A. C. strain gage element bridge having input and output terminals, said first secondary winding being connected to the input terminals of said element bridge to energize said bridge, a strain gage impedance forming a part of said bridge and mechanically attached to said stressed member to be stressed simultaneously therewith thereby to change its impedance and unbalance said bridge to produce an unbalance A. C. potential at the output terminals of said bridge which is a function of the variations in the strain of said stressed member, a balancing bridge having input and output terminals, the other of said secondary windings being connected to the input terminals of said balancing bridge to energize said bridge, an adjustable impedance forming part of said balancing bridge and variable to produce an unbalance A. C. potential at the output terminals of said balancing bridge, electric circuit means interconnecting the output terminals of said element bridge and said balancing bridge to oppose said unbalance A. C. potentials, and null indicating means connected in said circuit means to indicate when said unbalance A. C. potentials are equal, whereby variations in the strain in said stressed member may be measured by measurement of the adjustment of said adjustable impedance necessary to produce a null indication on said indicating means.

15. In apparatus for measuring the value of a condition, in combination, a plurality of balance- able element bridge circuits each having input and output terminals, a first source of potential for energizing said element bridges, a plurality of impedance elements each forming a part of one of said element bridge circuits and each being variable in response to variations in the value of a first condition to unbalance its element bridge to produce unbalance potentials at the output terminals of said element bridges, which potentials are functions of the variations in the value of said first condition, a balancing bridge circuit having input and output terminals, a second source of electric potential connected to the input terminals of said balancing bridge for energizing said bridge, an adjustable impedance forming part of said balancing bridge circuit and variable to produce an unbalance potential at the output terminals of said balancing bridge circuit, circuit connecting means adapted to connect the output terminals of one of said strain gage element bridges to the output terminals of said balancing bridge, said circuit connecting means including contact members having a finite resistance that is subject to small variations, balance-indicating means in said circuit connecting means to indicate when said unbalance potentials are equal and opposite, switching means for changing said circuit connecting means selectively to connect the input terminals of a selected element bridge to said first source of electrical potential and simultaneously connecting the output terminals of the same element bridge to the output terminals of said balancing bridge, and a compensating impedance element substantially identical to each of said plurality of impedance element positioned adjacent said elements but not exposed to said first condition and connected in said balancing bridge circuit to unbalance said balancing bridge circuit when subject to a change in the value of a condition other than said first condition by an amount and in the same direction as the unbalance of said element bridge circuits caused by the effect of an equal change of said other condition on said plurality of impedance elements whereby variations in the value of said first condition may be measured accurately in spite of variations in the contact resistance of said switching means by measurement of the adjustment of said adjustable impedance means necessary to produce an indication of balance on said balance-indicating means and in spite of the effect on said plurality of impedance elements of the variations in the value of said other condition.

16. In a measuring system for successively measuring the value of several condition sensitive elements wherein a single measuring apparatus is to be switched from one to another of the elements and wherein these removable connections have a finite resistance, the variations in which are of significant magnitude, apparatus comprising a plurality of element bridge circuits, a plurality of condition-sensitive elements each forming part of a separate one of said element bridge circuits and arranged to vary the extent of unbalance of its bridge circuit as a function of the magnitude of the condition being measured, a balancing bridge circuit, voltage supply means, means connecting said voltage supply means to energize said element bridge circuits and said balancing bridge circuit, an adjustable impedance forming part of said balancing bridge circuit and arranged to vary the extent of unbalance thereof, circuit connecting means having a plurality of removable connections each arranged to connect selectively the unbalance potential of one of said element bridge circuits to the unbalance potential of said balancing bridge circuit, and balance-indicating means connected to said circuit connecting means and arranged to indicate when said unbalance potentials are equal and opposite and current flow through said removable connections is minimized whereby each of said conditions can be measured accurately irrespective of variations in the resistance of said removable connections.

17. Apparatus as claimed in claim 16 including potential sensitive means connected to said circuit connecting means and arranged to rebalance said balancing bridge circuit, relay means connected to said potential sensitive means and responsive to a condition of equal energization thereof automatically to operate said circuit connecting means to connect the next of said element bridge circuits to said balancing bridge circuit, whereby the measurement of the value of another condition may be measured as soon as the measurement of the preceding one is concluded.

18. Apparatus as claimed in claim 17 including an electric motor forming part of said potential sensitive means and arranged to rebalance said balancing bridge circuit, a recording means driven by said motor to record the value of the conditions being measured, and time delay means associated with said relay means to provide a period for making a record after balance and before commencement of the measurement of the value of the next condition.

19. Apparatus as claimed in claim 16 including potential responsive means connected to said circuit connecting means, a solenoid motor operated by said potential responsive means and arranged to rebalance said balancing bridge circuit, relay means connected across said solenoid motor means, a movable chart, a chart drive motor arranged to move said chart through a predetermined increment of motion, recording means driven by said motor means and arranged to record the value of a condition being measured, time delay means associated with said relay means, means initiating the operation of said time delay means in response to deenergization of said relay means, means responsive to the operation of said time delay means to initiate operation of said chart drive motor through said predetermined increment of motion, and means responsive to the operation of said chart drive motor through said increment automatically to operate said connecting means to switch the next of said element bridges to said balancing bridge circuit, whereby the measurement of the value of the condition with which the next of said bridges is associated may be made as soon as the preceding measurement and recording are complete.

20. In a measuring system for successively measuring the value of several condition sensitive elements wherein a single measuring apparatus is to be switched from one to another of the elements and wherein these removable connections have a finite resistance subject to significant variations, apparatus for minimizing errors caused by the resistance variations comprising a plurality of balanceable element bridge circuits having input and output terminals, a first source of energizing potential connected to the input terminals of said element bridges, a plurality of impedance elements each forming part of one of said element bridge circuits and each being variable in response to variations in a predetermined condition to be measured to produce an unbalance potential at the output terminals of its respective bridge circuit, a balancing bridge circuit having input and output terminals, a second source of energizing potential connected to the input terminals of said balancing bridge, an adjustable impedance forming part of said balancing bridge circuit and being variable to produce an unbalance potential at the output terminals of said balancing bridge circuit, a plurality of removable connections each arranged to connect selectively the output terminals of one of said element bridge circuits in series with the output terminals of said balancing bridge circuit, said removable connections having a finite contact resistance the variations in which are of significant magnitude in comparison with the variations in values of the impedance elements being measured, and null indicator means connected to said output terminals and arranged to indicate when said unbalance potentials are equal and opposite and current flow through said removable connections is minimized whereby each of said conditions can be measured accurately irrespective of variations in the resistance of said removable connections.

21. In a measuring system for successively measuring the value of several condition sensitive elements wherein a single measuring apparatus is to be switched from one to another of the elements and wherein these removable connections have a finite resistance subject to significant variation, apparatus comprising a plurality of element bridge circuits having input and output terminals, a first source of electric potential connected to the input terminals of said element bridges, a plurality of impedance elements each forming part of one of said element bridge circuits and being variable in response to variations in a condition to be measured to produce an unbalance potential at the output terminals of its respective bridge circuit, an adjustable bridge circuit having input and output terminals, a second source of electric potential connected to the input terminals of said adjustable bridge for energizing said bridge, an adjustable impedance forming part of said adjustable bridge circuit and being variable to produce an unbalance potential at the output terminals of said adjustable bridge circuit, a plurality of removable connections each arranged to connect selectively the output terminals of one of said element bridge circuits in parallel with the output terminals of said adjustable bridge circuit, said removable connections having a finite contact resistance the variations in which are of significant magnitude in comparison with the variations in values of the impedance elements being measured, and null indicator means connected to said output terminals and arranged to indicate when said unbalance potentials are equal and opposite and current flow through said removable connections is minimized whereby each of said conditions can be measured accurately irrespective of variations in the resistance of said removable connections.

WILFRED H. HOWE.
ROBERT W. CUSHMAN.

(References on following page)

REFERENCES CITED

The following references are of record in the file of this patent:

UNITED STATES PATENTS

| Number | Name | Date |
|---|---|---|
| 1,379,266 | Keeler | May 24, 1921 |
| 1,404,311 | O'Neill | Jan. 24, 1922 |
| 1,472,125 | Keeler | Oct. 30, 1923 |
| 1,681,047 | Porter | Aug. 14, 1928 |
| 2,045,474 | Kemler | June 23, 1936 |
| 2,135,511 | Holven | Nov. 8, 1938 |
| 2,252,464 | Kearns | Aug. 12, 1941 |
| 2,255,601 | Schmitt | Sept. 9, 1941 |
| 2,329,841 | Keinath | Sept. 21, 1943 |
| 2,330,427 | Hornfeck | Sept. 28, 1943 |
| 2,393,669 | Wheaton | Jan. 29, 1946 |

FOREIGN PATENTS

| Number | Country | Date |
|---|---|---|
| 11,765 | Great Britain | A. D. 1902 |